United States Patent
Chiu

(12) 
(10) Patent No.: US 6,354,503 B1
(45) Date of Patent: Mar. 12, 2002

(54) BAR CODE ONLINE SCANNER/VERIFIER

(75) Inventor: Lihu Chiu, Arcadia, CA (US)

(73) Assignee: RJS Systems International, Irvine, CA (US)

( * ) Notice: Subject to any disclaimer, the term of this patent is extended or adjusted under 35 U.S.C. 154(b) by 0 days.

(21) Appl. No.: 09/598,928

(22) Filed: Jun. 21, 2000

(51) Int. Cl.$^7$ .................................................. G06K 7/10
(52) U.S. Cl. ............................ 235/462.18; 235/462.01; 235/462.08
(58) Field of Search ....................... 235/462.19, 462.25, 235/462.08

(56) References Cited

U.S. PATENT DOCUMENTS

| | | | | |
|---|---|---|---|---|
| 4,859,840 A | * | 8/1989 | Hasegawa .................... | 235/463 |
| 5,886,337 A | * | 3/1999 | Rockstein et al. ..... | 235/462.25 |
| 6,015,089 A | * | 1/2000 | Hecht et al. ........... | 235/462.16 |
| 6,039,253 A | * | 3/2000 | Reichenbach et al. . | 235/462.01 |

* cited by examiner

*Primary Examiner*—Karl D. Frech
*Assistant Examiner*—Ahshik Kim
(74) *Attorney, Agent, or Firm*—Leon D. Rosen

(57) ABSTRACT

A bar code scanner/verifier rapidly analyzes reflections of a scanning laser beam to determine whether or not a scanned line portion contains a bar code, so analysis of a bar code begins only when a legitimate bar code is present. The apparatus reads transitions in reflectance and indicates that a bar code is not present when the transitions are not large enough to qualify for a bar code, and when there are not enough transitions per unit distance. The circuit does this by generating MAX minus MIN, where MAX continually decreases over time but is raised every time a high reflectance is encountered, and MIN continually increases over time but is lowered every time a low reflectance is encountered. When MAX minus MIN drops below a programmable predetermined noise level, the circuit indicates that there is no bar code. Another circuit counts the number of transitions in a region where MAX minus MIN is above the noise level, and indicates that a bar code is present only if at least a certain number of transitions, e.g. 17, are found within a predetermined scan distance such as 2 cm. The circuit for detecting the presence or absence of a bar code can be implemented in analog, or in software using sparse data, e.g. every 4 or 8 samples.

11 Claims, 6 Drawing Sheets

BAR CODE ONLINE SCANNER/VERIFIER

BACKGROUND OF THE INVENTION

In a traditional bar code scanner, a laser beam is scanned along a predetermined distance and reflections of the laser beam are detected and analyzed. Where the scanning apparatus is controlled by a gate, e.g. a photo-interrupter, and is activated only when objects with a bar code are presumed present, it is only necessary for the circuitry to record data during the gating, and then process the recorded data at some later time. This is generally done by converting the analog output of a photo-sensor that detects the reflected laser beam, to a digital signal representing the edges of the bars of a bar code, and recording the digital data when commanded by the gating circuitry. The edges and their distances yield characters, and those characters can be compared to all possible characters in a table to determine what characters are represented by each portion of the bar code.

In most applications, a bar code is present only a minority of the time, while non bar code markings are present the rest of the time. In that case, if the output from the photo-sensor is converted to digital data and all of it is analyzed, then most of the time the analysis will indicate no bar code corresponding to those in the lookup table. Considerable time is wasted in making a detailed analysis of all data. Even worse, the analysis can erroneously detect a bar code and locate a table entry representing a character that is not present.

In a bar code verifier, it is necessary in many cases to detect the presence of a bar code without the aid of a gating device. In this case, the device must determine the presence of a bar code by a self-locking means and must process the data in real time. Additionally, the reflectance profile of any scanned object contains a change in the intensity over the scan path. This requires a mechanism in which gating can be done by intensity, and by the transition density.

A verifier must not report bar code data that could be erroneous. It also must provide data pertaining to the quality of the printing as per ANSI X3.182-1990 methods. This methodology requires that data is processed digitally with gathered analog reflectance data from the photo-sensor.

A verifier must, as a consequence of its applications, process much more data than an equivalent scanner. Considerable time is required to convert the analog output of the photo-sensor to digital form, and to compare a sequence of numbers representing the transitions in reflection to a lookup table to determine if a legitimate bar code character is present. If a legitimate bar code is present, the verifier must determine what that character is and what is the quality of printing of that character.

A system that more rapidly and accurately discriminates between reflections representing a bar code and those that do not represent a bar code would enable more rapid and accurate scanning. Rapid scanning is necessary for a verifier that scans each bar code a plurality of times to determine how close to the "standards" the bar code is. That is, to determine whether maximum and minimum reflectances are within acceptable ranges, and to avoid wasting time analyzing areas that do not contain bar codes. It is especially important for a verifier to avoid misinterpreting areas that do not contain bar codes, as bar codes, and to not give the bar code a lower qualifying grade because of scanning related problems as opposed to printing related problems.

SUMMARY OF THE INVENTION

In accordance with one embodiment of the present invention, an apparatus is provided for scanning a bar code, which enables rapid analysis of reflections of a laser beam scan line portion to determine whether or not a complete bar code is likely to be present along the scan line. The apparatus includes a circuit that records transitions of at least a predetermined magnitude, of light detected by a photodetector, and that generates a signal indicating that a bar code is not present in an area that begins with a first transition, and that does not have a subsequent transition within a predetermined distance along the scan line following the first transition. The circuit for detecting transitions and the time between them can be implemented in an analog circuit or in software using sparse data, e.g. every 4 or 8 samples. The use of one of these techniques enables more rapid analysis.

The apparatus for detecting the presence of bar codes can include a circuit that generates signals representing a MAX value and a MIN value and that generates a signal representing MAX minus MIN. If MAX minus MIN drops below a predetermined noise level, then this indicates that a bar code is not present in the area from the beginning of a scan line or from a first transition, to the time when MAX minus MIN decreases below the noise level. MAX continually decreases, but suddenly increases to the level of any high reflectance, while MIN continually increases, but suddenly decreases to the level of any low reflectance. The circuit for establishing MAX and MIN and analyzing it is implemented in an analog circuit, or as equations in a field programmable gate array, or in software using sparse data, e.g. every 4 or 8 samples for rapid analysis.

The circuit also includes a section that counts the number of transitions and the length of the scan region. If there is not a predetermined number of transitions, such as 17, within the scan length, such as 2 cm, then that scan region is determined to not contain a bar code. The count can begin every time a new transition is detected.

The novel features of the invention are set forth with particularity in the appended claims. The invention will be best understood from the following description when read in conjunction with the accompanying drawings.

BRIEF DESCRIPTION OF THE DRAWINGS

FIG. 15 is a schematic diagram of a circuit that detects the distance between a first transition or the beginning of a scan, and the next transition, to determine the presence of a bar code portion there between.

DESCRIPTION OF THE PREFERRED EMBODIMENTS

Figure 1:
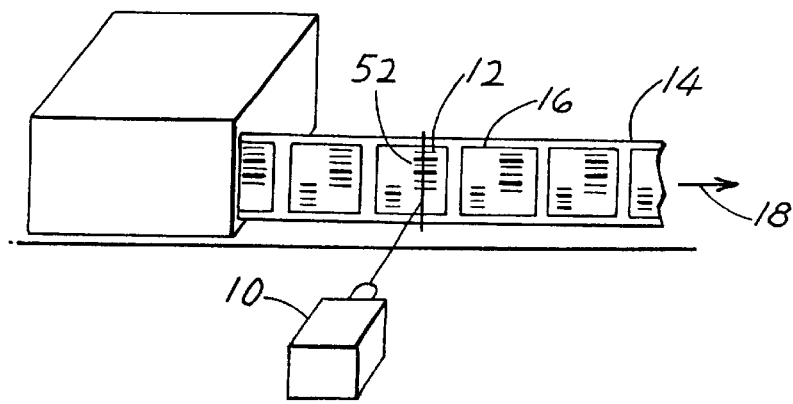
FIG. 1 is a simplified isometric view of apparatus for scanning bar codes to verify the quality of the bar codes.
Figure 2:
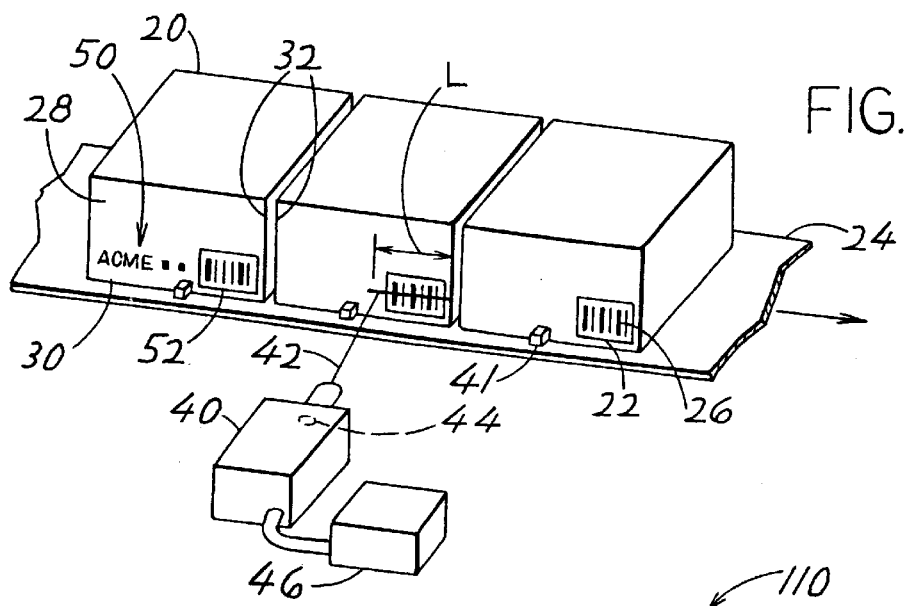
FIG. 2 is an isometric view of apparatus for scanning bar codes to read them.

FIG. 1 illustrates apparatus 10 for scanning bar codes such as 12 to verify whether or not they meet certain standards, such as more than a minimum reflectivity for areas adjacent to and between bar code elements, less than a maximum reflectance at the bar code elements, spacing of bar code elements within certain parameters, etc. In verification, each bar code element is commonly scanned a plurality of times, as a strip 14 containing bar code labels 16 moves in the direction of arrow 18. FIG. 2 shows another situation, where boxes 20 containing labels 22 on box surfaces 28 are moved along a conveyor belt 24, and are moved off the conveyor belt to selected areas depending on the address indicated by the bar code 26 on each label. Each box also has markings 30 that are not part of bar codes, and there are edges 32 near bar codes. An apparatus 40 is provided to detect and read the bar codes. The distance between the apparatus and the scanned surface is generally fixed, as with conveyor belt guides 41, and a relationship is established of scan time to distance along the scan line, as in the prior art. The apparatus includes a source that generates a laser beam 42 that is rapidly scanned along a predetermined scan length, at a predetermined velocity for a surface at a predetermined distance from the source. A bar code may be present along the scan line. A photodetector 44 detects reflections of the scanning laser beam, and a circuit 46 detects the presence of a bar code and reads it.

Figure 3:
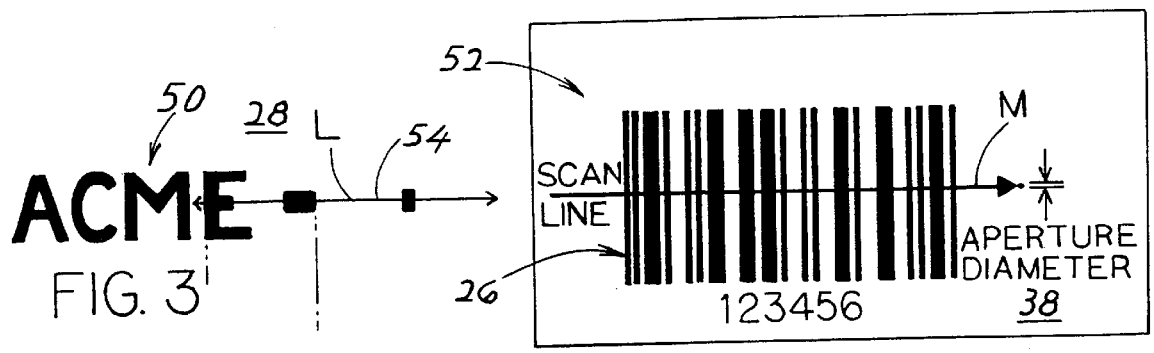
FIG. 3 is an elevation view of a surface of a package which is scanned to determine the presence of a bar code.
Figure 4:
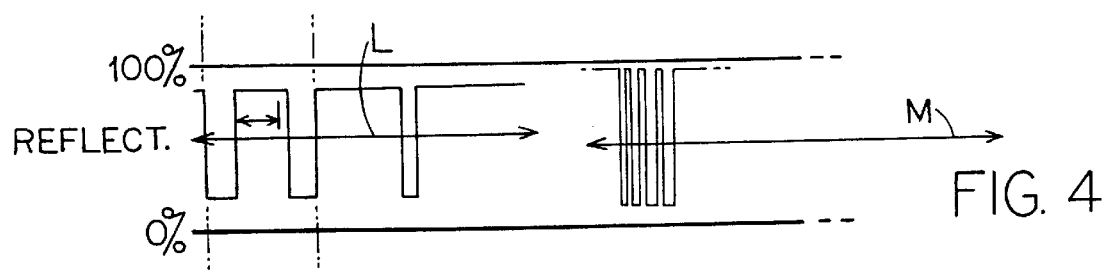
FIG. 4 is a graph showing variation in the analog output in percent reflectance with time, from a photodetector that detects the scanned laser beam of FIG. 3.
Figure 5:
FIG. 5 is graph showing counts of transitions with time.

FIG. 3 illustrates a portion of the front face of the box 20 of FIG. 2 showing markings 50 that do not represent a bar code, and markings 52 that do represent a bar code 26. FIG. 4 shows an output from the detector 44 of FIG. 2 that detects reflections of the laser beam that is being scanned along the surface 28 of the box. FIG. 3 shows that along the markings 50, there is a long distance between adjacent transitions, while along the bar code 52, the transitions are closely spaced. FIG. 5 shows a count of each transition. Along the length L of the scan line 54, there are only six transitions. Each large change in reflectance can represent an edge of a bar code element. In a common type of bar code that applicant's apparatus reads, there is a minimum number of transitions in each bar code, that number being 17. Since there are only six transitions along the distance L, this indicates that there is no complete bar code within the scan distance L. Within the scan distance M there will be 38 transitions. This indicates that there is a high probability of a complete bar code lying within the scan line M. A first transition can be considered to occur at the beginning of a scan line and at an initial transition that occurs after it is determined that a bar code is not present prior to that initial transition.

Figure 6:
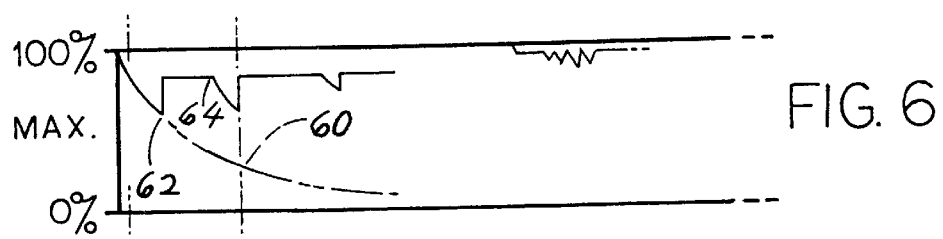
FIG. 6 is a graph showing variation in MAX value with time, calculated for the reflection variation with time of FIG. 4.
Figure 7:
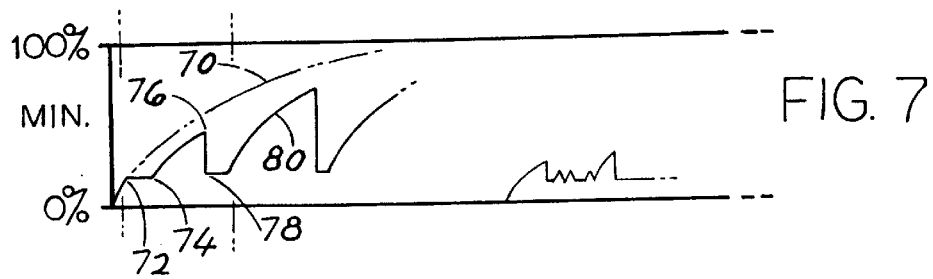
FIG. 7 is a graph showing variation in MIN with time as a result of the reflection graph of FIG. 4.

FIG. 6 shows another quantity that applicant's circuit calculates, this being a signal MAX whose magnitude indicates the proportion of high reflectance area along the scan line. The signal MAX, which starts at 100% at the beginning of the scan line, tends to decay along the curve 60 which is asymptotic to zero percent. The decay is in the manner of decay of voltage across a capacitor that is constantly being drained. FIG. 7 shows another quantity MIN which represents the amount of dark area along the scan line. The quantity MIN increases from zero at the beginning of the scan line, and along a line 70 that is asymptotic to the 100% level.

MAX in FIG. 6 decreases as shown, until a bright area (high reflectance) at point 62 is sensed, when MAX increases to the percent reflectivity of the bright area. MAX continues at the level of reflectivity until a point 64 is reached when the brightness decreases, when MAX decreases according to the curve 60 (actually, a curve parallel to 60). Since most of the area along the scan line L is highly reflective, MAX will remain at a relatively high level. MIN, shown in FIG. 7, increases along the curve 70 until a point 72 is reached indicating a sudden (slight) decrease in reflectivity, with MIN then decreasing to that percent reflectivity. At point 74, reflectivity increases, and MIN increases according to curve 70, until a next point 76 is reached, when reflectivity suddenly decreases and MIN decreases to point 78 equal to that decreased reflectivity. Along portion 80, MIN is increasing according to curve 70 (according to a curve parallel to 70).

Figure 8:
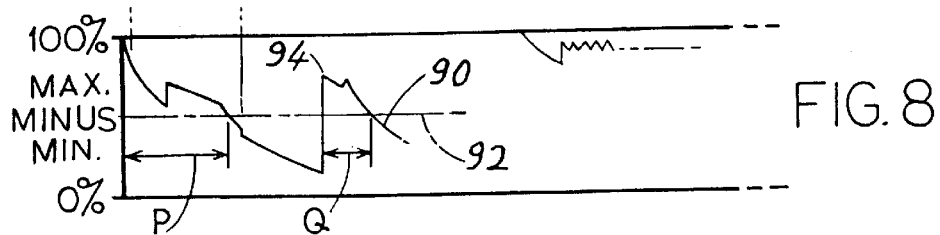
FIG. 8 is a graph showing variation in MAX minus MIN with time resulting from the graphs of FIGS. 6 and 7.

FIG. 8 is a graph 90 showing MAX minus MIN. Because of the long distances between locations where reflectivity changes, MAX minus MIN generally decreases. When the graph 90 falls below a predetermined noise level 92 that applicant has set to indicate that a bar code has not been detected, such lack of a bar code in the first third of the scan line length is indicated. At point 94, when another area of low reflectance is indicated, the quantity MAX minus MIN increases above the noise level, which indicates that there may be a bar code following the point 94. The circuit determines that no bar code is present along the lengths P and Q because each of these lengths is less than a minimum bar code length that applicant has set, such as 2 cm.

Corresponding values resulting from the actual bar code 52 of FIG. 3 are also indicated at the right half of each FIG. 4–8, showing that they indicate the beginning of an actual bar code. It should be noted that the photodetector output of FIG. 4 is continually stored (and later erased) in a memory so that the characters indicated by an actual bar code can be read after the presence of a bar code is determined. The reading of a detected bar code includes conversion of the signal of FIG. 4, through an analog-to-digital converter, to digital signals, and which are processed by a computer that has been programmed to process them. Since digital signals require many bits, such as 8 bits to represent reflection values between 0% and 100%, it requires more time to analyze digital signals than analog signals.

Figure 11:
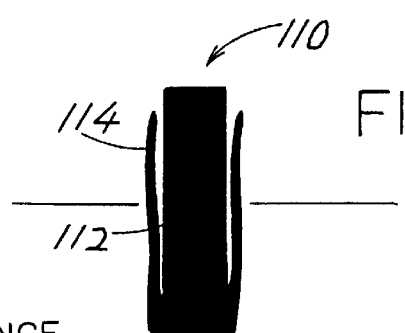
FIG. 11 is a view of a distorted bar code element.
Figure 12:
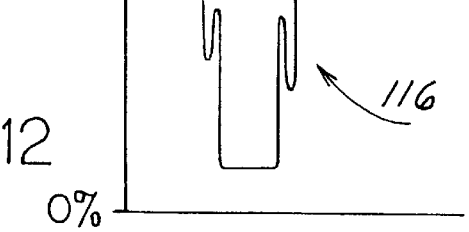
FIG. 12 is a graph showing change of reflectance with time when scanning the bar code element of FIG. 11.
Figure 9:
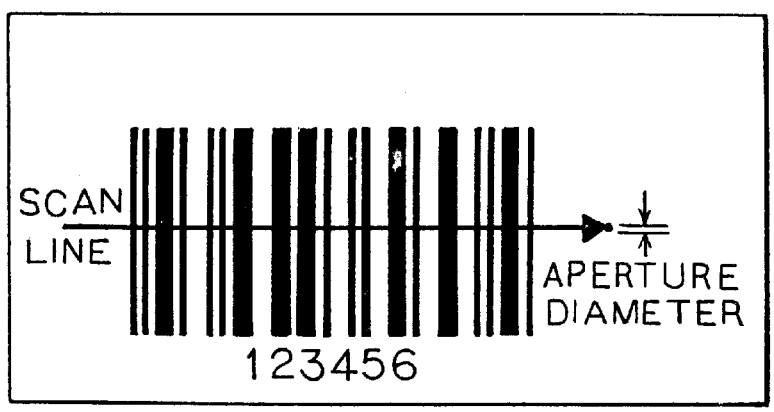
FIG. 9 is a front elevation view of a bar code label.
Figure 10:
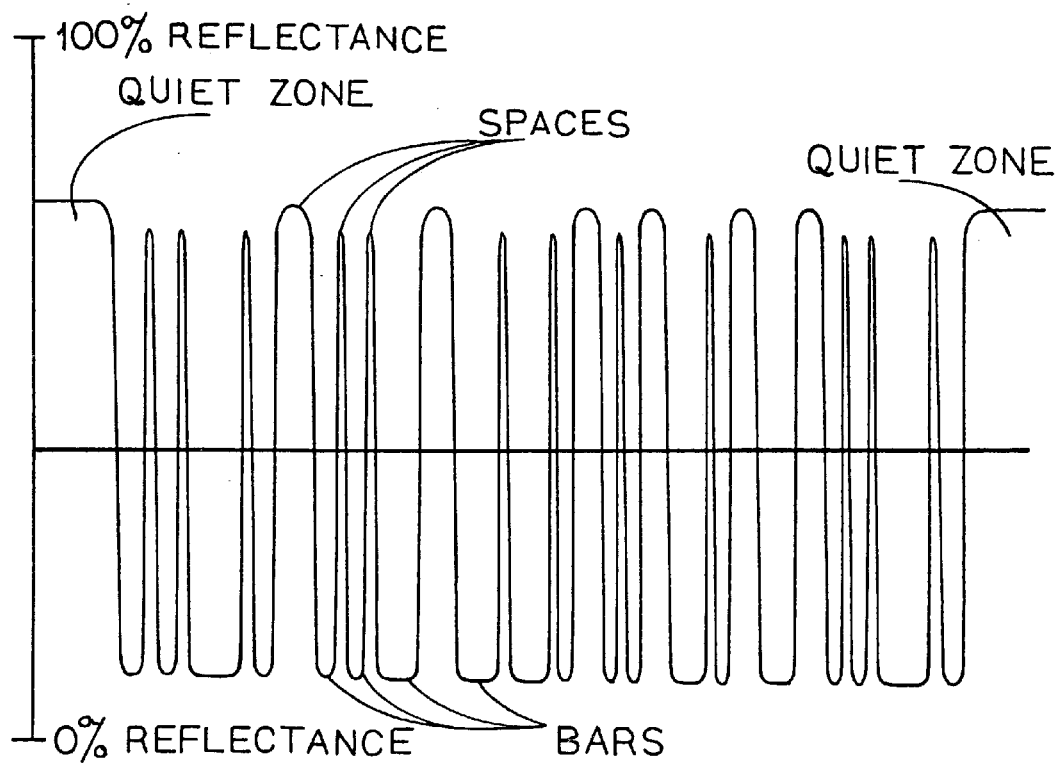
FIG. 10 is a graph showing variation in reflectance with time of the output of a photodetector when scanning the bar code of FIG. 9, with the horizontal time coordinate expanded from that of the label of FIG. 9.

FIG. 9 shows a bar code, while FIG. 10 shows the scan reflectance profile that has actually been detected when scanning that bar code. The example in FIG. 10 is for a scan profile that results in clear identification of the bar code. In some cases, the level of reflectance of the light and dark areas does not have the simple changes shown. For example, FIG. 11 shows a bar code element 110 that has been printed by a rubber stamp, with dark areas at 112 and 114. FIG. 12 shows variation in the photodetector output when the bar code element 110 is being scanned. An analog-to-digital converter, which is used by applicant and is widely used in the prior art, provides an indication of many reflection levels at each of numerous closely spaced locations along a scan line, so that the signal 116 of FIG. 12 can be analyzed to determine whether it represents a single bar code or two bar codes. The many more bits in a digital code results in more time required to analyze it, than does an analog circuit to analyze a signal. The digital analysis enables a more precise determination of a code, while applicant's analog circuitry enables a rapid determination of whether a bar code exists. By rapidly eliminating large areas from consideration for digital analysis, applicant's circuitry enables more rapid scanning and analyzing of bar codes.

Figure 13:
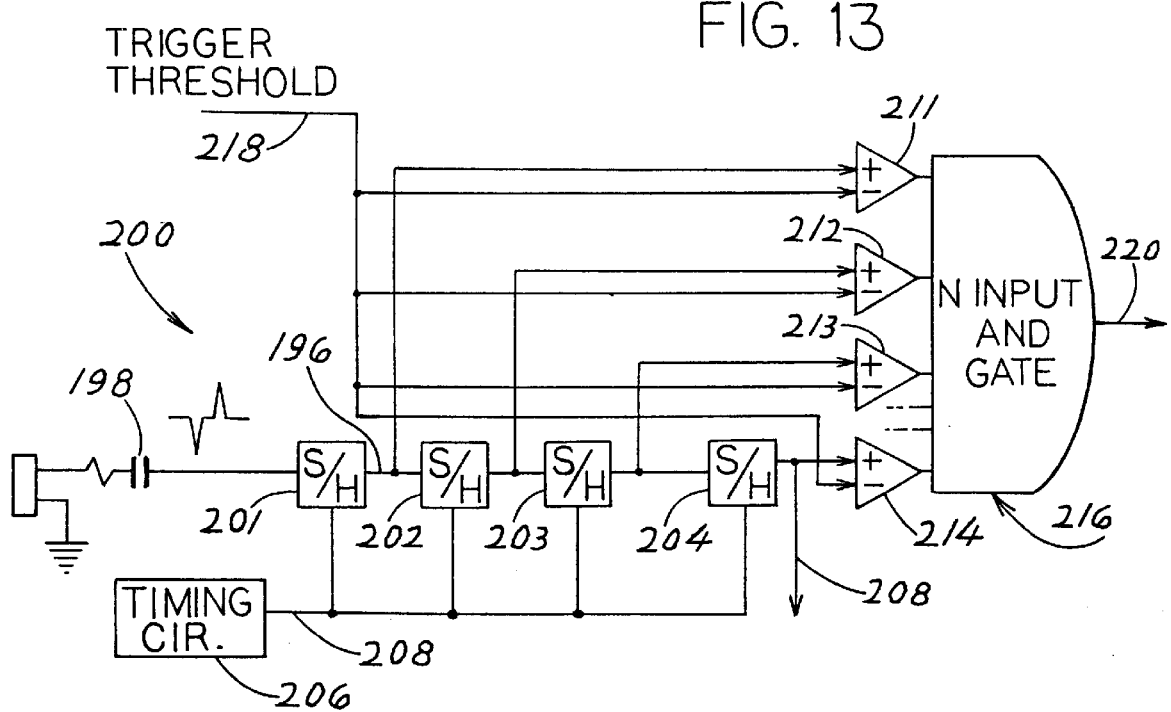
FIG. 13 is a primarily analog circuit that determines the number of transitions of at least a predetermined magnitude, over a predetermined scan distance, to determine the presence of a bar code.
Figure 13A:
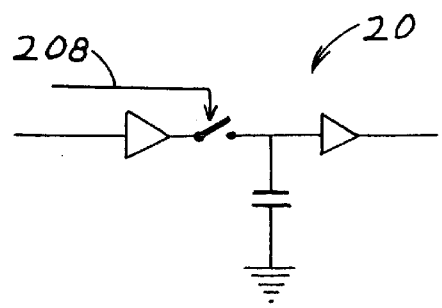
FIG. 13A is a simplified schematic diagram of one of the sample-and-hold circuits of FIG. 13.

FIG. 13 is a schematic diagram of a circuit 200 that performs two functions. First, it provide an output, as on line 196, indicating each transition of at least a predetermined value, such as a change of at least 45% of total reflectance from a 100% reflecting surface. The circuit includes a series or chain of store-and-hold circuits 201, 202, 203, etc. up to 204 with the first one 201 connected to the output of the photodetector 44 and with subsequent store-and-hold circuits connected in series. Only when a rapid change in reflectance such as 45% of total reflectance occurs, is a signal transmitted through a capacitor 198 to the first circuit 201. At predetermined intervals, a timing circuit 206 delivers a pulse on line 208 to each of the store-and-hold circuits, which then transfer their charge to the next store-and-hold circuit. The charges stored in all circuits 201–204 are delivered through gates 211–214 to an N input AND gate 216. Only if the stored charges on all circuits 201–204 is above a threshold on line 218, is a bar code likely to be present. FIG. 13A is a simplified view of a store-and-hold circuit 201, which is known.

Figure 14:
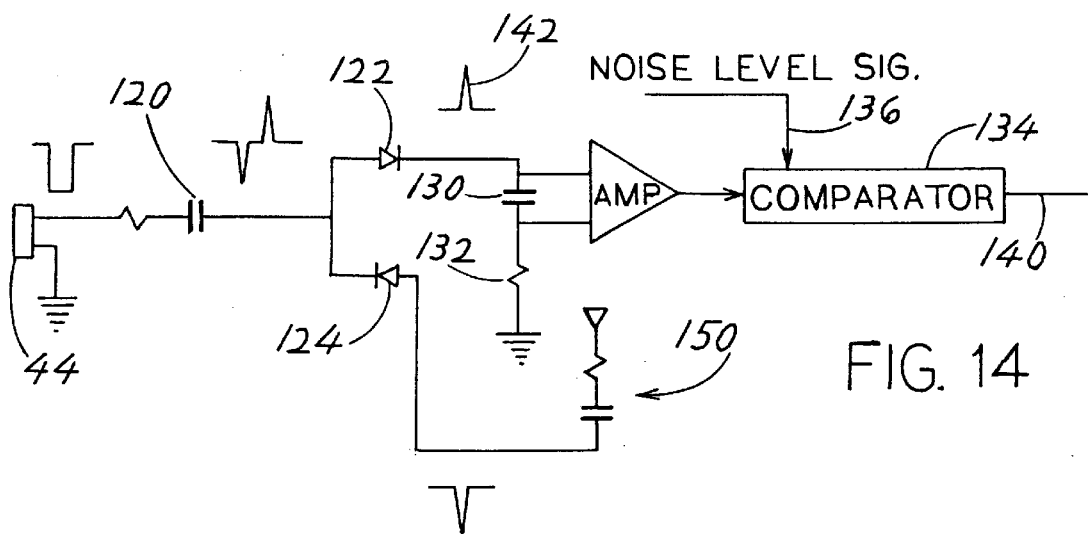
FIG. 14 is a schematic diagram of a circuit that generates a signal representing MAX and MIN as illustrated in FIGS. 6 and 7, and that compares MAX minus MIN to a predetermined noise level.

FIG. 14 is a schematic diagram of a circuit that determines the number of transitions per unit length of the scan line along which the laser beam is scanning. The output from the detector 44 passes through a capacitor 120 that allows rapid changes to pass but that restricts the passage of slower changes, so that only rapid changes in reflectance pass. Positive changes in reflectivity pass through a diode 122, while negative changes in reflectivity pass through a diode 124. The magnitude and polarity of any rapid change in reflectivity is information that passes through the diodes. Transitions below a predetermined magnitude do not pass through either diode. Signals passing through the diode 122 charge a capacitor 130. The charge on capacitor 130 indicates the number (and magnitude) of positive transitions in reflectivity. The magnitude of transitions above a certain value can be limited to that certain value, where desired. However, a resistor 132 constantly discharges the capacitor 130, so the charge on capacitor 130 represents the number and amplitude of positive transitions during a limited period of time, that is, during a predetermined scan distance. The voltage across capacitor 130 is delivered to a comparator circuit 134 which compares the voltage on capacitor 130 to a noise voltage on line 136. If the voltage across capacitor 130 drops below the noise level, the comparator's circuit 134 generates a signal on line 140 that indicates that the scan line, up to the time that the comparator delivers the signal on line 140, does not contain a bar code.

The number of positive transitions 142 is very close to half of all transitions, so the comparator 134 can be set to indicate lack of bar code when only 8 or 9 of the minimum of 17 transitions is detected. A similar circuit portion 150 detects negative transitions. A circuit can be provided that detects both negative and positive transitions, as by reversing the polarity of only negative transitions (or of only positive transitions), and adding both positive and reverse-polarity negative transitions. In that case, only if there are a predetermined number of transitions such as seventeen, within a time period representing a predetermined scan distance such as 2 cm, will signal 140 indicate that a digital analysis of that area is desirable.

Figure 15:
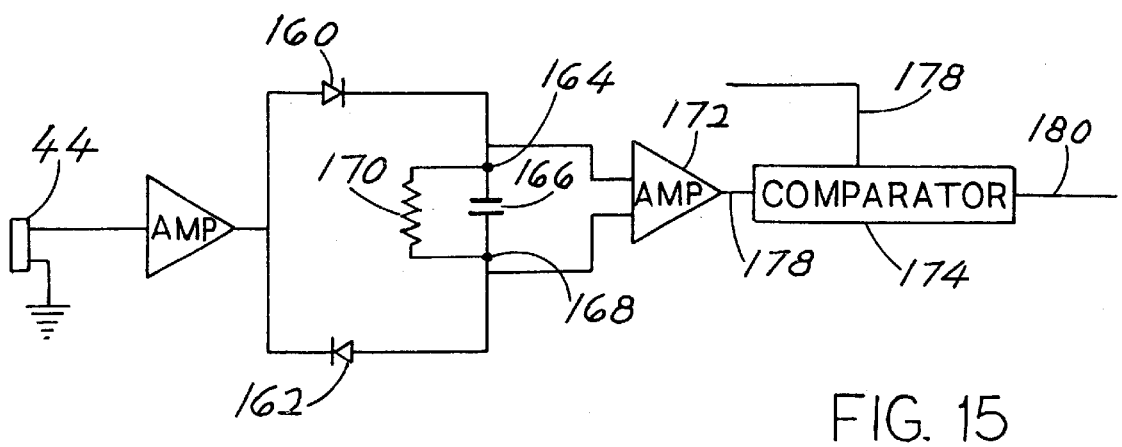

FIG. 15 is a circuit that determines MAX minus MIN values. Positive going transitions pass through diode 160 while negative-going transitions pass through diode 162, with positive transitions increasing the voltage at location 164 on one side of a capacitor 166, and with negative transitions decreasing the voltage at the other side 168 of the capacitor. A resistor 170 slowly drains the charge on the capacitor. An amplifier 172 amplifies the voltage difference across capacitor 166 and delivers it to a comparator circuit 174 that compares the voltage on line 176 to a noise level voltage on line 178. The output of the comparator circuit on line 180 indicates when it is determined that a bar code does not exist between the time when MAX minus MIN was above noise level to the time when MAX minus MIN decreases below the noise level.

Figure 16:
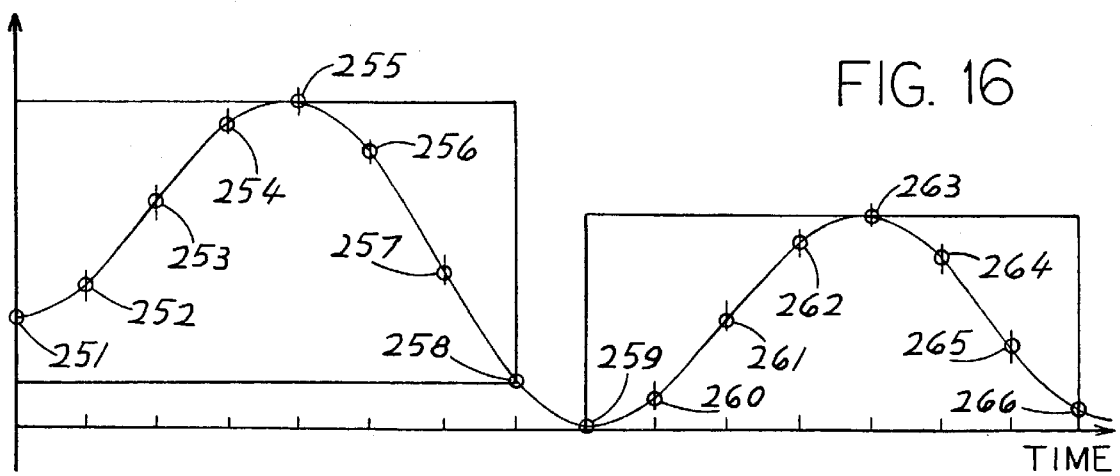
FIG. 16 is a graph showing variation of amplitude with time, of the output of the photodetector of FIG. 2, and showing a digital sampling of the amplitude, in accordance with another embodiment of the invention.
Figure 17:
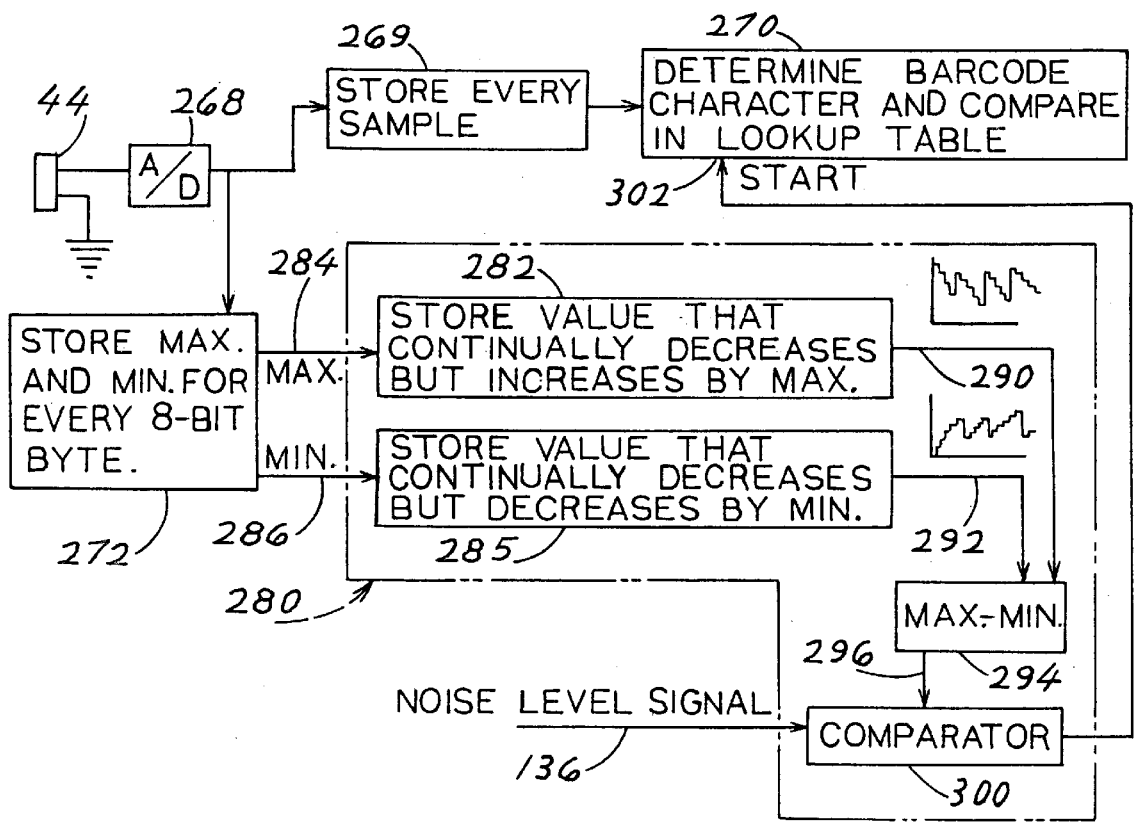
FIG. 17 is a block diagram showing operation of a sparse data digital system for detecting the presence of a bar code, using points on the graph of FIG. 16.

FIG. 16 is a graph 240 of amplitude vs. time, which represents the output of the photodetector 44, and which shows digital sampling of the output at points such as 251–266. Eight points such as 251–258 represent the minimum width of a bar code element or space. In FIG. 17, multi-bit signals, or bytes, representing the amplitudes of points 251–266 are delivered through an A/D converter 268 and storage circuit 269 to a digital analyzing circuit. The circuit 270 determines the presence of each bar code element (line and space) and compares the amplitudes and positions of bytes that represent bar code elements, to characters in a lookup table to try to find a match. Also, the circuit can indicate the quality of printing of the bar code on a label or directly on a cardboard box. This is known in the art.

FIG. 16 shows that each group of eight (or other number) of sampled points in a group includes point 255 of maximum (max) amplitude and point 256 of minimum (min) amplitude. The circuit 272 of FIG. 17 digitally stores only the max and min amplitude of each group of eight bytes, representing the eight points 251–258.

FIG. 17 shows a MAX-MIN digital circuit 280 whose functions are performed by computer software. The circuit 280 performs a function similar to that shown in graphs of FIGS. 6–8 and in the circuit of FIG. 15. In the circuit 280 of FIG. 17, a first part 282 stores a magnitude that starts at 100% (100% reflectivity) and decreases asymptotically toward zero, (e.g. graph 60 in FIG. 6), but that increasesto the value of a max input on line 284 that exceeds the stored value. A second circuit 285 part stores a magnitude that starts at zero and increases asymptotically toward 100% (e.g. graph 70 in FIG. 7) and that decreases to the value of a min input on line 286. The stored values are delivered over lines 290, 292 to a circuit part 294 that determines the difference (MAX-MIN) and delivers it on line 296 to a comparator 300. In the comparator 300, MAX-MIN is compared to a set noise level signal on line 136. When MAX-MIN exceeds the noise level, comparator 300 delivers a signal on line 301 to START input 302 of circuit 270. When the signal on line 301 continues for a predetermined minimum period (representing the minimum bar code length), this causes the circuit 270 to begin analyzing to detect bar code characters and compare them to a look-up table.

The circuit 280 is implemented by a computer that is programmed to perform the steps described above. The fact that the data to be analyzed by the computer portion 280 represents no more than one-fourth of the data collected by circuit 269 for detailed analysis, allows a rapid determination of the presence or nonpresence of a bar code.

Thus, the invention provides an apparatus for laser beam scanning a surface, which includes circuitry that determines whether or not a bar code is present along a portion of a scan line, and which accomplishes this in a rapid manner. The circuitry includes a circuit that detects transitions of detected reflections of at least a predetermined magnitude and that generates a signal indicating that a bar code is not present along a scan line area immediately following a first transition, when a second transition fails to be detected within a predetermined distance of the first transition. The circuit also includes a portion that counts the number of transitions of at least a predetermined value, and indicates lack of bar code if there are not at least a predetermined number of transitions, such as 17 transitions within a scan line distance of 2 cm, or at least 8 positive-going or 8 negative-going transitions within such distance. The circuit also includes a portion that generates a signal equal to MAX minus MIN, where MAX continually decreases until a reflectance above the MAX level is detected, and then increases to that level, but then decreases at a controlled rate as long as a lower reflectance is detected. MIN continually increases until a reflectance below the MIN level is detected, and then decreases to that level, but then increases at a controlled rate. When MAX minus MIN drops below a predetermined noise level, a circuit indicates that a bar code has not yet been detected along the scan line (e.g. from the beginning of the scan line or from the end of the last bar code). In one system, rapid response is obtained by using substantially only analog circuitry for detecting the presence of a bar code. In another system, sparse digital circuitry is used by using one-fourth or less of the digital bytes,that are stored for detailed analyses after detection of a bar code is established. In a preferred system, the max and min bytes of each group of perhaps eight, are used.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. Apparatus for scanning for a bar code on a surface that moves past the apparatus, where the apparatus includes a scanning laser beam source which scans along a predetermined distance and a detector for detecting reflections of the laser beam and for generating analog signals representing the magnitude of the detected reflections, comprising:

an analog circuit that records transitions, of at least a predetermined magnitude, of the light amplitude detected by said detector, and that generates a signal indicating that a bar code is not present in an area that includes a first transition and an area immediately following said first transition, when a second transition fails to be detected within a predetermined distance following said first transition,said analog circuit being constructed to generate a signal representing MAX minus MIN, wherein:

said MAX value continuously decreases in value at a controlled MAX rate, from a magnitude representing substantially complete reflection until the magnitude of a bright reflection is detected with a reflection magnitude greater than the instantaneous MAX value and with the MAX value then immediately increasing to said value of said bright reflection and then continuously decreasing again at said controlled MAX rate;

said MIN value continuously increases in value at a controlled MIN rate from a magnitude representing substantially no reflection until a low detected reflection is detected with a brightness level less than the instantaneous MIN value and with the MIN value then immediately decreasing to the value of said low detected reflection and then continually increasing again at said controlled MIN rate;

said analog circuit includes a circuit part that generates said signal indicating that a bar code is not present in said area that includes said first transition when the signal representing MAX minus MIN decreases below a predetermined level.

2. Apparatus for scanning for a bar code on a surface that moves past the apparatus, where the apparatus includes a scanning laser beam source and a detector that detects reflections, comprising:

a first circuit that begins a digital analysis of a possible bar code at a predetermined location after said laser beam has scanned past said location;

a second circuit connected to said detector, said second circuit constructed to generate a difference signal representing MAX minus MIN wherein;

MAX can vary from substantially 0% to 100% and is raised to a level representing the present reflection of a bright reflection when the percent reflection of the bright reflection exceeds the immediately preceding level of MAX, and with MAX thereafter decaying at a controlled rate;

MIN can vary from substantially 0% to 100% and is lowered to a level representing the percent reflection of a dim reflection when the percent reflection of the dim reflection is less than the immediately preceding level of MIN, and with MIN thereafter increasing at a controlled rate;

said second circuit is constructed to control said first circuit to begin a digital analysis of a possible bar code that begins at said predetermined location only when said difference signal exceeds a predetermined noise level signal along at least a predetermined minimum scanning distance.

3. The apparatus described in claim 2 wherein:

said second circuit is constructed so said controlled rates of MAX and MIN are asymptotically to substantially 0% and 100%, respectively.

4. The apparatus described in claim 2 including:

an analog-to-digital converter connected to said detector that produces digital bytes;

a first digital program part that stores all of said bytes and delivers all bytes received within a limited time period to said first circuit;

a second digital program part that is connected to said converter but that takes no more than one-fourth of the bytes produced by said converter and that generates MAX minus MIN from said no more than one-fourth of the bytes.

5. The apparatus described in claim 4 wherein:
said second digital program part takes only the highest and lowest bytes, which represent the highest and lowest values, of each group of at least eight bytes received from said converter, and generates MAX and MIN from said highest and lowest bytes.

6. Apparatus for scanning for a bar code on a surface that moves past the apparatus, where the apparatus includes a scanning laser beam source and a photodetector that detects reflections, comprising:
a first circuit that begins a digital analysis of a possible bar code at a predetermined location where said laser beam has scanned past said location;
a second circuit coupled to said photodetector, said second circuit constructed to generate an edge signal that represents a bar code element edge whenever a rapid change in reflectance is detected, where the change exceeds a predetermined percent of maximum reflection;
a counting circuit which counts the number of said edge signals detected within a predetermined scan distance following a first of said edge signals, and which controls said first circuit to begin a digital analysis of a possible bar code that begins at said first of said edge signals only when the number of said edge signals within said scan distance exceeds a predetermined number;
said first circuit is constructed to convert the output of said photodetector to digital signals that each has one of numerous digital values, while said second circuit is an analog circuit that does not process multiple distinct value digital signals.

7. A method for determining when a bar code is being scanned by an apparatus that scans a laser beam across a line path and that detects reflections and generates analog reflection signals representing the amplitude of reflections of the laser beam, and for indicating when a digital bar code analysis is to begin, comprising:
recording transitions in said reflection signals which exceed a predetermined percent of maximum laser beam reflection and using an analog circuit to generate a signal that indicates that analysis should begin of a bar code lying within a portion of a scan line that begins at a first of said transitions, only when a second of said recorded transitions is detected within a predetermined distance along the scan line following detection of said first transition.

8. A method for determining when a bar code, rather than a non-bar code area, is being scanned by an apparatus that scans a laser beam across a line path and that generates analog reflection signals representing the amplitude of reflections of the laser beam, and for indicating when a digital bar code analysis is to begin, comprising:
generating a signal equal to MAX minus MIN, where MAX and MIN are each variable between substantially 100% reflectivity and 0% reflectivity, by employing transitions in the percent reflectivity of said reflections signals and beginning MAX and MIN at a level of substantially 100% and 0%, respectively, at the beginning of a scan line path portion, to suddenly increase the value of MAX to a level equal to the percent reflectivity of a given upward transition caused by a scanned location of higher reflectivity than the level of MAX signal at the time of detection of said given upward transition, and to suddenly decrease MIN to a level equal to the percent reflectivity of a given downward transition cause by a scanned location of lower reflectivity than the level of MIN at the time of detection of said given downward transition;
continually decreasing MAX and increasing MIN when the level of MAX and MIN is not suddenly increased or decreased, respectively;
when MAX minus MIN is less than a predetermined noise level, indicating that a bar code is not present between said beginning of a scan line path portion and the location along said scan line where MAX minus MIN becomes less than said noise level.

9. A method for determining when a bar code, rather than a non-bar code area, is being scanned by an apparatus that scans a laser beam across a line path and that generates analog reflection signals representing the amplitude of reflections of the laser beam, and for indicating when a digital bar code analysis is to begin, comprising:
counting the number of transitions of said analog reflection signals that exceed a predetermined magnitude within a predetermined minimum scan distance, and indicating that a bar code is not to be analyzed when the number of transitions is less than a predetermined number;
said predetermined number is at least eight.

10. A method for determining when a bar code, rather than a non-bar code area, is being scanned by an apparatus that scans a laser beam across a line path and that generates analog reflection signals representing the amplitude of reflections of the laser beam, and for indicating when a digital bar code analysis is to begin, comprising:
converting said analog reflection signals to digital signals, including generating bytes representing the magnitude of said analog signals at predetermined intervals;
storing said bytes and later using said bytes to perform a bar code analysis;
using only a fraction of said bytes, including using no more than two bytes out of every eight consecutive bytes, to determine whether an area being scanned contains a bar code or does not contain a bar code.

11. The method described in claim 10 wherein:
said step of using only a fraction of said bytes includes determining the bytes of highest and lowest amplitude in each group of at least eight consecutive bytes, and using only said bytes of highest and lowest amplitude in determining whether or not an area contains a bar code.

* * * * *